United States Patent Office 2,984,729
Patented May 16, 1961

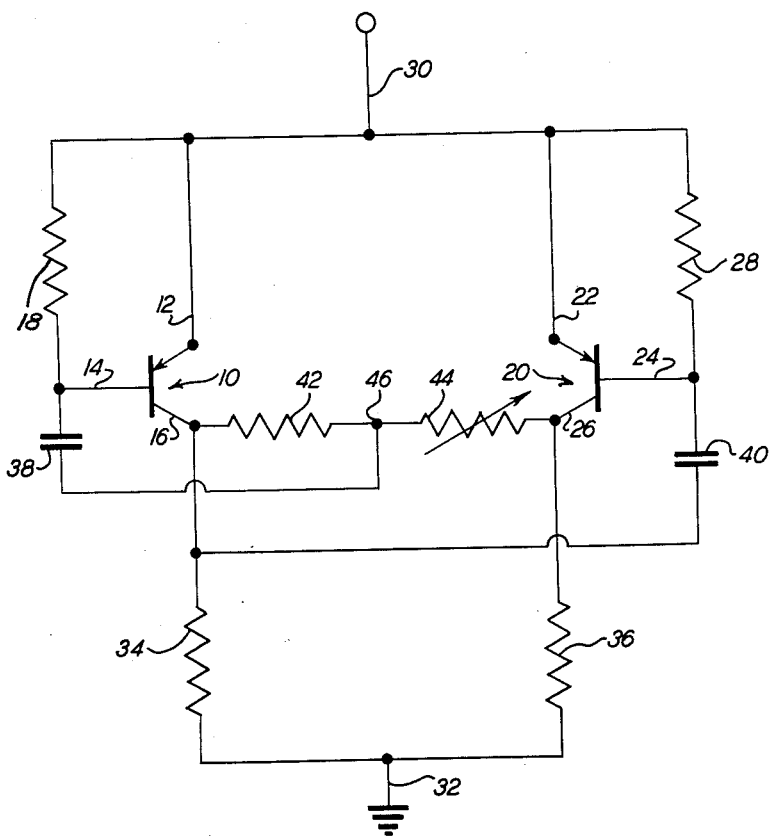

2,984,729

MULTIVIBRATOR TYPE OVEN CONTROL

Glenn R. Hykes and Donald E. Johnson, Cedar Rapids, Iowa, assignors to Collins Radio Company, Cedar Rapids, Iowa, a corporation of Iowa Filed Nov. 10, 1958, Ser. No. 773,078

2 Claims. (Cl. 219—20)

This invention relates generally to an electrical resistance heating system suitable for an oven or the like, and more particularly to a heat control or regulating arrangement for such system.

Basically a heat control arrangement for an oven consists of the combination of an oven, a regulatable heater for the oven, and heat-sensitive means located within the oven and operative to regulate the heater to maintain a predetermined temperature within the oven.

In most oven systems it is desirable that the heat control arrangement be capable of maintaining a preset even or substantially constant temperature in the oven. In oven systems utilizing electrical resistance heaters, it has proven difficult to achieve a continuous regulation of the temperature with the commonly used heat-sensitive means which comprise bi-metallic control switches or sylphon bellows actuated control switches. Such switches are used to control the flow of current through the resistance heating element, but provide inherently poor temperature regulation in that they give a discontinuous step-by-step or on-off control of the electric power delivered to the heaters. It has been proposed to use bi-metallic or bellows actuated potentiometers or rheostats in order to achieve improved temperature regulation in electrically heated oven systems. However this presents additional disadvantages of cost; moving contact problems of wear, dirt, maintenance, and erratic operation; increased complexity, and the like.

Accordingly it is an object of this invention to provide an improved heat control arrangement capable of maintaining a substantially constant regulated temperature in an electric resistance heated oven.

It is a further object of this invention to provide a substantially continuous heat control arrangement for an electric oven.

An additional object of the invention is to provide an electric circuit including electrical resistance heating means and heat-sensitive control means therefor of extreme simplicity which utilize no moving parts.

A particular object of this invention is to provide a heat control arrangement for an electric oven which has none of the above enumerated disadvantages of the prior art, and advantageously provides a substantially continuous flow of electric power to the heater.

A more specific object of this invention is to provide a temperature sensitive electric oscillator circuit wherein the resistance heater means of an electric oven forms one portion of the oscillator circuit, and the heat control arrangement for such oven forms another portion of the oscillator circuit.

The features of this invention which are believed to be novel are set forth with particularity in the appended claims. The invention itself, however, both as to its organization and method of operation, together with further objects and advantages thereof, may best be understood by reference to the following description taken in connection with the accompanying drawing in which the single figure is a schematic diagram of the electric oven heat control embodying the principles of this invention.

According to the invention an electric oven system is provided in the form of a temperature sensitive oscillator circuit. The oscillator is basically a free running multivibrator circuit. In the embodiment shown, a pair of transistors 10 and 20 are utilized, however it will be obvious to those skilled in the art that electronic vacuum tube devices may be substituted for such transistors in accordance with known principles of equivalency and duality.

Transistor 10 includes emitter electrode 12, base electrode 14, and collector electrode 16; and transistor 20 includes emitter electrode 22, base electrode 24, and collector electrode 26. Emitters 12 and 22 are directly connected to one pole of a source of D.C. energizing potential at terminal 30. The other pole of the D.C. potential source is connected to the ground reference point 32. The D.C. potential source has not been shown, however in accordance with known principles it should be properly poled to agree with the type of transistors, NPN or PNP which are used.

Resistor 18, connected between emitter 12 and base 14 of transistor 10, sets the operating bias level for the left hand stage of the multivibrator oscillator, while resistor 28 performs a similar function for the right hand stage. Resistor 28 is connected between emitter 22 and base 24 of the transistor 20.

Collector 16 of transistor 10 is connected to ground by way of resistor 34, and collector 26 of transistor 20 is connected to ground by way of resistor 36. Oscillation or multivibrator action is provided by a cross-coupling or feedback arrangement by means of coupling capacitors 38 and 40.

It will be noted that coupling capacitor 40 interconnects the base 24 of the right hand transistor 20 with collector 16 of the left hand transistor 10 in the conventional multivibrator arrangement. Coupling capacitor 38, however, is not directly connected from base 14 of transistor 10 to collector 26 of transistor 20, but instead this feedback path includes a series network consisting of a thermistor 42 and resistor 44, with capacitor 38 connected to their common junction point 46. The free end of thermistor 42 is connected to collector 16, and the free end of resistor 44 connects to collector 26. Resistor 44 may be variable, as shown in the drawing, for a purpose to be later described.

As used in an electric oven the collector resistors 34 and 36 are the electrical heater elements for the oven. The heaters 34 and 36, together with thermistor 42 and resistor 44 form a bridge arrangement. Thermistor 42 is a temperature sensitive device which exhibits a negative coefficient of resistivity, i.e., upon an increase of temperature the resistance of the unit decreases. For example, at room temperature of 25° C. thermistor 42 may exhibit an impedance of the order of 10,000 ohms, while at 70° C. the impedance may be reduced to a value of 1,800 ohms. The two heaters 34, 36 and thermistor 42 are located in the oven, not shown.

In considering the operation of the invention we may first assume that the series resistance network 42, 44 is a single impedance connected between collectors 16 and 26, and that such impedance is not heat-sensitive. If coupling capacitor 38 is returned directly to collector 26 of the right hand transistor a self-starting free running multivibrator oscillator is obtained. Oscillations will occur as the left hand and right hand transistors alternately conduct, in a well known fashion, and the frequency of such oscillations is determined, in part, by the circuit values of the coupling capacitors 38 and 40. Under this assumed condition of operation maximum oscillations occur and the unit delivers full power to the heaters 34 and 36 in the form or alternate pulses of current conducted through transistors 10 and 20, respectively.

It will be further apparent that if coupling capacitor 38 were to be returned directly to its own collector 16 that the multivibrator relation would be destroyed and that no oscillations would occur. Therefore, if the junction point 46 to which coupling capacitor 38 is returned is considered as an adjustable feedback tap which may be moved along the assumed composite impedance comprised of elements 42 and 44, it will be seen that movement of such feedback tap from collector 26 toward the left hand collector 16 will decrease the amplitude of the oscillations and thus decrease the amplitude of the power pulses supplied to the oven heaters 34 and 36. When such tap is moved sufficiently far toward collector 16, the oscillations will be decreased to zero.

By providing a temperature-sensitive resistance by way of the thermistor 42, in the series network 42, 44, the same control of heater power is achieved without resorting to the use of an adjustable feedback tap for capacitor 38. When the impedance of thermistor 42 decreases with an increase of temperature, the amplitude of the power pulses supplied to the heaters 34, 36 decreases, and at some temperature the heat loss from the oven equals the power which is being applied thereto, and an equilibrium condition exists. The temperature at which this condition exists may be predetermined by adjustment of the variable resistor 44.

Obviously various refinements, changes and modifications may be incorporated in the basic embodiment of the invention described above, such as are known or will occur to those skilled in the art. For example, since circuit elements 34, 36 and 42 are the only ones located within the oven, the remaining circuitry which is outside of the oven may be adversely affected by ambient temperature changes with resultant temperature instability. Thus known refinements may be added such as using temperature sensitive thermistors for the bias resistor elements 18 and 28, or temperature compensated capacitors for elements 38 and 40. Such refinements or modifications will depend substantially upon special conditions in a particular application of the invention without departing from the principles thereof which are set out in the appended claims.

We claim:

1. A temperature control for an electric oven having plural heater elements, a pair of transistors, said transistors being connected to a source of power and being interconnected as a multivibrator type of oscillator, means to connect each transistor to a heater element so that pulsed power is delivered to said heater elements, and oscillation control means inserted in the interconnection of one transistor to the other to automatically and inversely control the power delivered by the said oscillator to the heater elements in response to temperature changes within the oven to thereby maintain a substantially constant temperature level within the oven.

2. A multivibrator oscillator control system for heating ovens having plural heating resistors, comprising first and second oscillation generating means, means to connect the first said generating means through a feedback path directly to the second generating means, a pair of resistors having a common terminal, said resistors being connected between said first and second generating means, means to connect the second generating means through a feedback path to the first generating means through the common terminal of said pair of resistors, and means connecting each said generating means to a heating resistor, said heating resistors and said pair of resistors being interconnected in a bridge arrangement, one of said pair of resistors having a negative temperature coefficient of resistance to inversely vary the power flow from both the generating means, by controlling the mode thereof, to the oven to maintain a temperature equilibrium in the oven.

References Cited in the file of this patent

UNITED STATES PATENTS

| | | |
|---|---|---|
| 2,616,020 | Fay et al. | Oct. 28, 1952 |
| 2,870,310 | Van Overbeek | Jan. 20, 1959 |
| 2,872,556 | Obermaier | Feb. 3, 1959 |
| 2,920,214 | Moore | Jan. 5, 1960 |
| 2,920,247 | Fisher | Jan. 5, 1960 |

OTHER REFERENCES

Bevitt: Transistors Handbook, Prentice Hall, Inc., Englewood Cliffs, N.J., 1956, pages 314–320.